US006592832B1

(12) United States Patent
Friedrich et al.

(10) Patent No.: US 6,592,832 B1
(45) Date of Patent: Jul. 15, 2003

(54) METHOD FOR PRODUCING HIGHLY PURE LITHIUM SALTS

(75) Inventors: Holger Friedrich, Bobenheim-Roxheim (DE); Joachim Pfeffinger, Ludwigshafen (DE); Bernd Leutner, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,110
(22) PCT Filed: Mar. 1, 1999
(86) PCT No.: PCT/EP99/01322
§ 371 (c)(1), (2), (4) Date: Aug. 29, 2000
(87) PCT Pub. No.: WO99/44941
PCT Pub. Date: Sep. 10, 1999

(30) Foreign Application Priority Data

Mar. 5, 1998 (DE) .......................... 198 09 420

(51) Int. Cl.⁷ ............... C01D 15/00; C01D 3/00
(52) U.S. Cl. ..................... 423/179.5; 423/490
(58) Field of Search .............. 423/179.5, 490, 423/499.3, 551, 395, 421, 305

(56) References Cited

U.S. PATENT DOCUMENTS

| | | | |
|---|---|---|---|
| 3,839,546 A | | 10/1974 | Mizdiyasni |
| 3,857,920 A | | 12/1974 | Grantham et al. .......... 423/208 |
| 4,803,137 A | * | 2/1989 | Miyazaki et al. |
| 4,859,343 A | | 8/1989 | Frianeza-Kullberg ....... 210/679 |
| 4,929,588 A | | 5/1990 | Frianeza-Kullberg ....... 502/402 |
| 4,939,050 A | * | 7/1990 | Toyosawa et al. |
| 5,389,467 A | * | 2/1995 | Herr et al. |
| 5,449,576 A | * | 9/1995 | Anani |
| 5,558,961 A | * | 9/1996 | Doeff et al. |
| 5,691,047 A | * | 11/1997 | Kurauchi et al. |
| 5,800,795 A | * | 9/1998 | Ryan et al. ................. 423/484 |
| 5,919,287 A | | 7/1999 | Moreau ....................... 95/130 |
| 6,048,507 A | * | 4/2000 | Amouzegar et al. |
| 6,207,126 B1 | * | 3/2001 | Boryta et al. |

FOREIGN PATENT DOCUMENTS

| | | |
|---|---|---|
| DE | 195 41 558 | 5/1997 |
| EP | 219 144 | 4/1987 |
| GB | 2 190 668 | 11/1987 |
| JP | 6 1251 511 | 11/1986 |
| JP | 63-74912 | * 4/1988 |
| WO | WO 97/48141 | * 12/1997 |

OTHER PUBLICATIONS

Bukowsky et al. "The Recovery of Pure Lithium Chloride from "brines" Containing Higher Contents of Calcium Chloride and Magnesium Chloride" Hydrometallurgy vol. 27 (1991) pp. 317–325, no month.

Gmelin, 8th Edition, vol. 6, VCH–Verlag Weinheim (1960) pp. 305–327, no month.

* cited by examiner

*Primary Examiner*—Steven Bos
(74) *Attorney, Agent, or Firm*—Keil & Weinkauf

(57) ABSTRACT

A process for preparing a high purity lithium salt from lithium carbonate comprises steps A to D as defined hereinbelow:

A: treating a mixture comprising lithium carbonate and water by means of $CO_2$ to obtain an aqueous mixture comprising lithium bicarbonate, B: passing said aqueous mixture comprising lithium bicarbonate through an ion exchanger module, C: precipitating lithium carbonate from the ion exchange module treated lithium bicarbonate mixture obtained in step B, and D: working up the precipitated lithium carbonate or converting the precipitated lithium carbonate into some other high purity lithium salt.

4 Claims, No Drawings

METHOD FOR PRODUCING HIGHLY PURE LITHIUM SALTS

The present invention relates to a process for preparing a high purity lithium salt from lithium carbonate by subjecting an aqueous mixture comprising lithium bicarbonate to a treatment with an ion exchanger module.

High purity lithium compounds have become important in connection with the development of lithium secondary cells in particular, since such cells utilize, for example, $LiPF_6$ or $LiBF_4$ conducting salts. These or similar conducting salts are generally prepared from lithium salts, for example lithium fluoride (LiF) or lithium chloride (LiCl), which in turn are obtained from lithium carbonate ($Li_2CO_3$). To be able to prepare conducting salts useful for the above purposes from the lithium salts mentioned, the latter must already be very pure. More particularly, it is desirable for the foreign metal ion content to be not more than 1 ppm.

Accordingly, the literature discloses a number of processes for obtaining high purity lithium salts, especially from lithium fluoride.

The preparation of high purity lithium fluoride by the Stockbarger process, a zone melting process for preparing LiF in the form of single crystals, is described in Gmelin, 8th edition, Vol. 6, VCH-Verlag Weinheim, 1960, pages 305–327. However, this process, which is used to obtain lithium fluoride in the form of single crystals for optical purposes, is very complicated and costly and accordingly unsuitable for the production of large amounts of LiF.

U.S. Pat. No. 3,839,546 describes a process for preparing high purity alkali metal halides by reacting an alkali metal alkoxide with gaseous halides such as HCl or $SiCl_4$. This process is likewise relatively complicated and costly, especially because elemental alkali metal is used as starting material for the alkali metal alkoxide.

DE-A 195 41 558 describes a process for purifying lithium chloride solutions, where the focus is mainly on removing undesirable sodium chloride contents. The lithium chloride solutions obtained therein by evaporation with yields of $\geq 99\%$ using a specific procedure are indeed essentially free from sodium chloride. The lithium chloride solutions obtained are said to have a sodium chloride content of less than 0.3% by weight. An NaCl content of 0.2% is exemplified.

Processes for preparing high purity lithium salts by treatment with an ion exchanger are likewise known. However, lithium chloride solutions are treated in every case (Hydrometallurgy, 27 (1991), 317–325, U.S. Pat. Nos. 4,859,343 and 4,929,588).

It is an object of the present invention to provide a simple process for preparing high purity lithium salts, especially from lithium fluoride, lithium carbonate and lithium chloride, on a large industrial scale.

We have found that this object is achieved by a process for preparing a high purity lithium salt from lithium carbonate, said process comprising steps A to D as hereinbelow defined:

A: treating a mixture comprising lithium carbonate and water by means of $CO_2$ to obtain an aqueous mixture comprising lithium bicarbonate, B: passing said aqueous mixture comprising lithium bicarbonate through an ion exchanger module, C: precipitating lithium carbonate from the ion exchanger module treated lithium bicarbonate mixture obtained in step B, and D: working up the precipitated lithium carbonate, i.e., essentially by separating it off, optionally washing with $H_2O$ or an $H_2O$-comprising solvent and drying, or converting the precipitated lithium carbonate into some other high purity lithium salt.

As is evident from the above, the process of the present invention starts from lithium carbonate, which is dispersed in water or in an aqueous solvent mixture with, for example, an alcohol, a ketone or aldehyde and converted by means of $CO_2$ into the water-soluble lithium bicarbonate. The concentration of lithium carbonate/lithium bicarbonate in the respective aqueous mixture is within the range from about 0.5 to about 30%, preferably within the range from about 3 to about 20%, by weight.

The resulting aqueous lithium bicarbonate mixture is then subjected to a treatment with an ion exchanger module (step B). According to the present invention, this step B is preferably carried out at from about 10 to about 70° C., more preferably at from about 20 to about 40° C.

Steps A and B are preferably carried out at superatmospheric pressure, since this makes it possible to achieve higher $LiHCO_3$ concentrations.

Commercially available ion exchange resins are used in this step B. Such ion exchange resins preferably consist of organic polymers having ion-active side chains, for example sulfo or carboxyl groups.

In principle, any polymer-based ion exchanger can be used according to the present invention, i.e., not only weakly but also strongly acidic cation exchangers. Ion exchanger modules useful for the present invention include apparatus (a column, for example) packed with the above-described cation exchangers in the form of powders, beads, granules, etc.

A particularly useful polymeric base material for such ion exchangers is a copolymer of styrene and divinylbenzene, especially a styrene-divinylbenzene copolymer which has aminoalkylenephosphonic acid groups or iminodiacetic acid groups.

Specific examples are:

resins under the tradename of Lewatit® such as, for example, Lewatit® OC 1060 (AMP type), Lewatit® TP 208 (IDA type), Lewatit® E 304/88, Lewatit® TP 207, Lewatit® S 100;

those under the tradename of Amberlite®, for example Amberlite® IR 120, Amberlite® IRA 743;

those under the tradename of Dowex®, for example Dowex® HCR;

those sold under the tradename of Duolite®, for example Duolite® C 20, Duolite® C 467, Duolite® FS 346; and those under the tradename of Imac®, for example Imac® TMR, the Lewatit® range being preferred.

Particular preference is given to using regenerated and hence relatively low sodium ion exchange resins of the Lewatit® type or other very low sodium ion exchange resins.

Further details concerning ion exchangers useful for the present invention are discernible inter alia from Ullmann's Encycl. of Industr. Chem., 5th edition, Vol. 14, pages 393–459, which reference shall be fully incorporated herein.

In the case of very impure lithium carbonate or bicarbonate or else to obtain particularly pure lithium compounds, step B may be carried out repeatedly, i.e., from two to 5 times, preferably from 2 to 3 times.

After passing through step B, the solution passes into a step C where lithium carbonate is reprecipitated, which may be done either by raising the temperature, preferably to the boiling point of the solution, and/or by reducing the $CO_2$ partial pressure. The temperature in step C is generally within the range from about 80 to about 100° C.

The lithium carbonate thus purified finally passes into a step D, where it is either directly worked up, i.e., essentially separated off, preferably filtered, optionally washed with $H_2O$ or an $H_2O$-comprising solvent, and dried and/or recrystallized once more, in which case steps A to C are carried out again, or treated with appropriate reagents, for example aqueous hydrofluoric acid or hydrochloric acid, to convert it into whichever salt is desired.

The lithium carbonate thus obtained generally has a foreign metal ion content of less than 10 ppm, preferably less than 5 ppm, especially less than 1 ppm, and a chloride content of less than 30 ppm, preferably less than 10 ppm, especially less than 5 ppm.

To obtain lithium fluoride, for example, the precipitated lithium carbonate is dispersed in water and reacted with aqueous hydrofluoric acid to form LiF. The LiF is produced in the form of a solid and may be obtained by filtration and subsequent drying in pure form as a solid. $CO_2$ escapes as gas.

It is similarly possible to prepare LiCl, LiBr, $Li_2SO_4$, $LiNO_3$, $Li_3PO_4$, $Li_2CO_3$ and other lithium salts, for example $LiBF_4$, $LiClO_4$, $LiAsF_6$, $LiCF_3SO_3$, $LiC(CF_3SO_2)_3$, $LiN(CF_3SO_2)_2$, $LiN(CF_3CF_2SO_2)_2$, $LiN(SO_2F)_2$, $LiAlCl_4$, $LiSiF_6$, $LiSbF_6$. Especially the latter are highly useful as conducting salts, and among these preference is in turn given to $LiPF_6$, $LiPF_4$ and $LiBF_4$.

In a further embodiment of the process of the present invention, it is sufficient to carry out the dissolving with $CO_2$ in step A and the precipitating of the lithium carbonate in step C repeatedly—instead of the repeated performance of step B—if merely large sodium and/or potassium quantities are to be removed.

Accordingly, the following sequence of steps is also possible within the process of the present invention:

1. step A-step B-step C-step A-step C-step D; or
2. step A-step B-step B-step C-step A-step C-step D; or
3. step A-step B-step C-step A-step B-step C-step D.

In a further embodiment of the present invention, the process of the present invention is carried out as follows:

step A: semicontinuously, i.e., the dispersion comprising water and $Li_2CO_3$ is charged initially and $CO_2$ is passed in;

step B: continuously;

steps C and D: batchwise.

As follows from the foregoing, the process of the present invention has the particular advantage that not only alkali metal cations, especially sodium ions, but also polyvalent cations, for example alkaline earth metal and transition metal ions, are very efficiently removable; the process of the present invention makes it possible to reduce the sodium concentration in $Li_2CO_3$ by a factor of up to more than 400; impurities due to polyvalent ions, for example calcium, magnesium, iron and/or aluminum, are virtually completely removed by the treatment with an ion exchanger as per step B. In addition, the product obtained is essentially free from chloride.

An embodiment of the present invention will now be more particularly described by way of example.

EXAMPLE

Preparation and Purification of LiF

First, 100 g of $Li_2CO_3$ (technical grade) (1.353 mol) and 2000 g of distilled water were weighed into a 2 l glass bottle.

$CO_2$ gas was then introduced for six hours at room temperature (21° C.) with stirring, until all the $Li_2CO_3$ had dissolved.

The solution obtained was filtered and pumped through an ion exchanger bed of regenerated Lewatit® TP 207 (100 ml), followed by washing with 100 ml of water.

The dosage rate through said Lewatit® TP 207 was 400 ml/h.

The solution obtained after passage through the ion exchanger bed was then boiled under reflux to cause the lithium bicarbonate (by detaching $CO_2$) to convert into lithium carbonate and precipitate.

The solution was cooled and filtered and the filter residue was washed with water and then dried at 300° C. to leave 69.6 g of dry lithium carbonate.

Of this amount, 58.22 g (0.788 mol) were once more admixed with water (1106 g), dissolved by stirring and $CO_2$ gas absorption and then filtered again.

This corresponds to a yield of 69.6%, based on the amount of lithium carbonate used.

The filtrate was admixed with 78.8 g of 40% strength by weight hydrofluoric acid (1.576 mol of HF), and the lithium fluoride was precipitated with $CO_2$ evolving. A pH of 7.5 was then set with ammonia solution, and the batch was filtered, and the filter residue was washed with water and dried at 300° C.

This gave about 39 g of lithium fluoride. This corresponds to a yield of 95.5%, based on the amount of lithium carbonate used after the treatment with the ion exchanger.

Accordingly, the overall yield of LiF based on the amount of $Li_2CO_3$ used is 66.4%.

The results with regard to the purity of the $Li_2CO_3$ and LiF obtained are shown in the table below.

| Foreign metal ion content | $Li_2CO_3$ used [mg/kg] | $Li_2CO_3$ 1st precipitation [mg/kg] | LiF [mg/kg] | Ratio of foreign metal ion concentration per mole of Li before/after 1st precipitation |
|---|---|---|---|---|
| Al | 7 | <1 | <1 | >7 |
| Ca | 60 | <1 | about 1 | >60 |
| Fe | 3 | <1 | <1 | >3 |
| K | 40 | <1 | <1 | >40 |
| Mg | 25 | <1 | <1 | >25 |
| Na | 480 | about 1 | <1 | 480 |
| Cl | 55 | <5 | <5 | 55 |

We claim:

1. A process for preparing high purity lithium fluoride from lithium carbonate comprising steps A to G as hereinbelow defined:

A: treating a dispersion comprising water insoluble lithium carbonate and water by introducing $CO_2$ to dissolve the lithium carbonate and obtain an aqueous solution of lithium bicarbonate, B: passing said aqueous solution comprising lithium bicarbonate through a polymer based ion exchanger, C: precipitating lithium carbonate from the ion exchanger treated lithium bicarbonate solution obtained in step B, D: separating said precipitated lithium carbonate obtained in step C by filtering and drying said filtered lithium carbonate, E: admixing said lithium carbonate obtained in step D with water and dissolving said lithium carbonate by introducing $CO_2$, F: filtering the solution obtained in step E and admixing hydrofluoric acid to the filtrate of said filtering to precipitate lithium fluoride, G: separating said precipitated lithium fluoride obtained in step F by filtering, washing the filter residue with water and drying said residue.

2. The process of claim 1, wherein ammonia is added in step G prior to separating said precipitated lithium fluoride obtained in step F by filtering.

3. The process of claim 1, wherein the amount of foreign ions present in the high purity lithium fluoride is less than 1 ppm Al, about 1 ppm Ca, less than 1 ppm Fe, less than 1 ppm K, less than 1 ppm Mg, less than 1 ppm Na, and less than 5 ppm Cl.

4. The process of claim 1, wherein said high purity lithium fluoride has a foreign metal ion content of less than 1 ppm.

* * * * *